United States Patent [19]

Miyagawa et al.

[11] 4,105,918
[45] Aug. 8, 1978

[54] THERMOLUMINESCENT TYPE RADIATION DOSIMETER READOUT APPARATUS

[75] Inventors: Katsuhiko Miyagawa; Hidenori Kunishige, both of Osaka; Hirotaka Otsuka, Hirakata; Fusafumi Nakao, Neyagawa, all of Japan

[73] Assignee: Matsushita Electric Industrial Co., Ltd., Osaka, Japan

[21] Appl. No.: 727,699

[22] Filed: Sep. 28, 1976

[30] Foreign Application Priority Data

Sep. 30, 1975 [JP] Japan .................................. 50/118537

[51] Int. Cl.² .............................................. G01T 1/115
[52] U.S. Cl. ...................................... 250/337; 250/484
[58] Field of Search ................................ 250/337, 484

[56] References Cited

U.S. PATENT DOCUMENTS

| 3,371,209 | 2/1968 | Rutland et al. | 250/337 |
| 3,638,017 | 1/1972 | Jones et al. | 250/337 |
| 3,809,901 | 5/1974 | Szalanczy et al. | 250/337 |

Primary Examiner—Archie R. Borchelt
Attorney, Agent, or Firm—Wenderoth, Lind & Ponack

[57] ABSTRACT

An apparatus wherein a thermoluminescent type radiation dosimeter is heated and thermoluminant rays emitted from the dosimeter are measured. It is constructed in such manner that to perform the measurement a personal identification card must be inserted to the apparatus. The mark on the dosimeter and the mark on the identification card are collated, and only when they coincide with each other is the measurement performed.

5 Claims, 6 Drawing Figures

THERMOLUMINESCENT TYPE RADIATION DOSIMETER READOUT APPARATUS

BACKGROUND OF THE INVENTION

The present invention relates to an apparatus for reading out a radiation dose from a thermoluminescent type radiation dosimeter and more particularly pertains to such apparatus which is suitable for controlling persons on the basis of radiation doses received.

A thermoluminescent type radiation dosimeter is an instrument for measuring doses of radiations such as neutrons and of ionizing radiations such as x-rays, $\gamma$-rays and $\beta$-rays. Usually, a thermoluminescent dosimeter is composed of one or more pieces of glass capsulated or tablet shaped thermoluminescent crystals such as calcium sulfate ($CaSO_4$: Tm; $CaSO_4$:Dy), lithium fluoride (LiF), lithium borate ($Li_2B_4O_7$), or a beryllium oxide (BeO) and is mounted on a metallic frame or a metallic plate.

Thermoluminescent dosimeters as described above emit thermoluminant rays when heated by a hot air jet stream, hot nitrogen gas, or a mechanical heating element. The thermoluminant rays emitted are proportional to the amount of irradiation to which the dosimeter has been subjected.

It has been well known that personnel radiation dose monitoring based on this idea is superior to conventional film type, pen type, or a glass type dosimeters in respect of adaptability, sensitivity and accuracy. Further the emissions from a thermoluminescent type dosimeter are easily measured automatically. Therefore it has been tried to automatically control entry and exiting at a gateway of a radiation hazard area on the basis of the doses received by persons passing through the gateway, and also to automatically total the doses of each individual person measured every time he passes the gateway where the measurement is performed.

In such system, however, accurate control has not been possible due to confusion between the dosimeters of different persons.

BRIEF SUMMARY OF THE INVENTION

In the view of the foregoing, it is an object of the present invention to provide a thermoluminescent type dosimeter readout apparatus wherein the correspondence between the dosimeter and a person carrying it is monitored and on the basis of such monitoring the measurement is controlled.

To achieve the above object, in the apparatus of the present invention a personal identification card has to be inserted into the readout apparatus for measurement. The dosimeter has marks corresponding to the marks on the personal identification card. Prior to the measurement, collation between the marks on the dosimeter and the personal identification card is performed.

BRIEF DESCRIPTION OF THE DRAWING

In order that the invention will be more clearly understood, it will now be described with reference to embodiments shown in the accompanying drawings in which:

Referring to FIG. 1, the thermluminescence type radiation dosimeter 1 is schematically shown. A thermoluminescent dosimeter element 1a is constituted by a piece of glass capsule in which powder of thermoluminescent cystals such as calcium sulfate ($CaSO_4$ : Tm ; $CaSO_4$ : Dy), lithium fluoride (LiF), or lithium borate ($Li_2B_4O_7$) are sealed. The reference numeral designates a metallic frame in which a plurality of holes 3 is provided, and the plurality of thermoluminescent dosimeter elements 1a constructed as described above are mounted in apertures in the frame 2. The metallic frame may be made of any suitable metallic material such as aluminum or stainless steel. A binary coded number or numbers can be made by filling certain of the holes 3 with a suitable heat resistant plastic material or rubber. After the elements 1a are exposed to radiation, they are placed in a measuring position in a readout apparatus to detect the intensity of the thermoluminant rays. The readout apparatus is generally a type which heats the elements 1a to a temperature between 300° C to 400° C, and then the thermoluminant rays emitted by the elements 1a are measured by a photomultiplier tube.

FIG. 2 shows a personal identification card 4 in which the reference numeral 5 designates punched holes, which are data or information needed for identifying a person working in a radiation hazard area. For easy identification of the identification card 4, the same information is also printed on it, and a person's photograph is adhered to the front of the card. (not shown)

Figure 1:
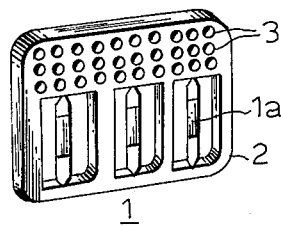
FIG. 1 is a perspective view of a thermoluminescent type radiation dosimeter embodying this invention.
Figure 2:
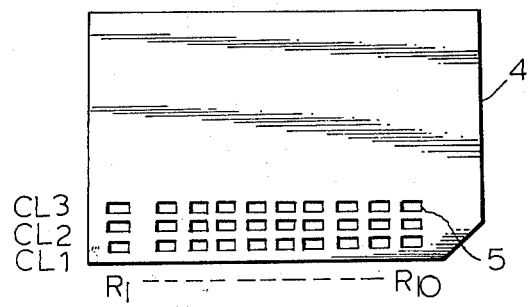
FIG. 2 is a plan view of a personal identification card embodying this invention.

In the thermoluminescent dosimeter readout apparatus of the present invention, the coded number or numbers on the frame 2 of the thermoluminescent dosimeter in FIG. 1 and the coded number or numbers on the identification card 4 as shown in FIGS. 2 are detected by a photo detection device, and when a key code in each of the numbers coincides, the measurement of the thermoluminant rays is permitted, but when a key code in each the respective numbers does not agree an alarm sounds a warning and the measurement of the thermoluminant rays is not be made.

In the following, the readout apparatus will be described in detail.

Figure 3:
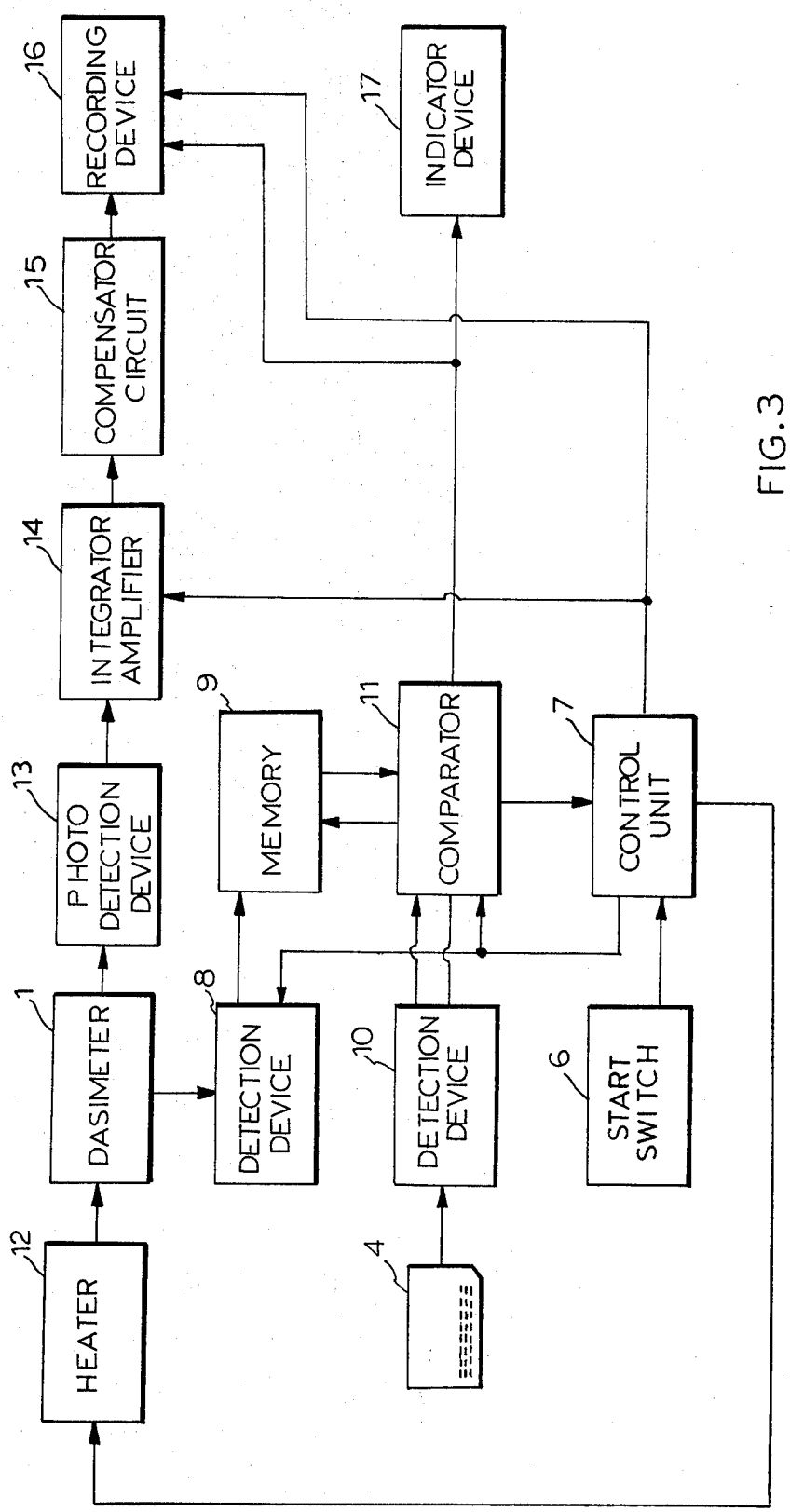
FIG. 3 is a block diagram of the thermoluminescent type radiation dosimeter readout apparatus in accordance with the present invention.

Referring to FIG. 3, the sequential control unit 7 is activated by the start signal from the start switch 6. Of course, both the thermoluminescent dosimeter 1 and the identification card 4 have previously been inserted in the respective measuring positions. The holes 3 in the metallic frame 2 of the thermoluminescent dosimeter 1 are detected by the detection device 8, and the detected code signals represented thereby are transferred to a semiconductive I C memory device 9 and memorized in it. The punched holes 5 on the identification card 4 are also detected by another detection device 10, and the detected code signals represented thereby are directly transferred to the comparator 11. As soon as the detected code signals are transferred to the comparator 11, the detected code signals memorized in the semiconductive IC memory device 9 are called up by a pulse signal from the comparator 11 and a code collation between them is made in the comparator 11. When the key code in both detected code signals coincides, a coincidence signal is transferred to the control unit 7. Then the control unit 7 starts a heating device 12 for sequentially heating the thermoluminescent dosimeter elements 1a up to a temperature between 300° C and 400° C. The thermoluminant rays emitted from respective thermoluminescent dosimeter elements 1a are detected by a suitable photo detection device 13 such as a photomultiplier tube, and thereby converted to a d.c. current signal. The d.c. current signals are integrated in an integrator amplifier 14 for a constant time interval. The value of the radiation dose can be indicated on a suitable indicator (not shown) or on a suitable recording device 16 via a compensator circuit 15 for changing the sensitivity of the thermoluminescent dosimeter. When measurement of severe radiation doses are required, the compensation circuitly 15 is necessary in order to compensate for the sensitivity of the thermoluminescent dosimeter elements 1a. But it may be omitted.

When the key codes in the detected code signal differ from each other, the signal to start the heating device 12 is not given from the comparator 11, so that the thermoluminescent dosimeter element 1 is not subjected to a heat treatment and measurements of the thermoluminant rays are not made. In this case, the disagreement between the detected code numbers is indicated by a suitable indicator 17 such as an alarm or a lamp.

Figure 4:
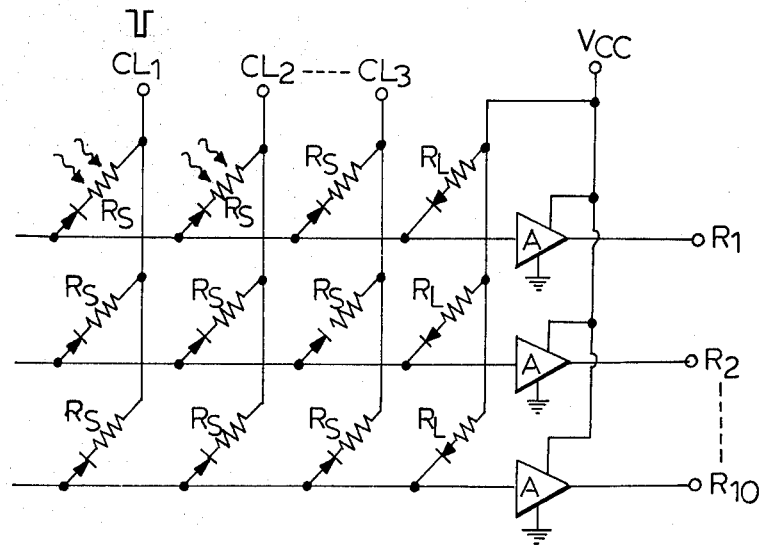
FIG. 4 is a circuit diagram of a detection device for detecting the coding numbers in the apparatus of FIG. 3.

FIG. 4 shows the details of the circuit diagram of the detection devices 8 and 10 for reading the coded numbers. As is shown in FIG. 4, the detection devices 8 and 10 for reading the coded numbers are composed of a matrix of photo sensors Rs of cadmium selenium. Binary coded numbers represented by the holes 3 or 5 in both the thermoluminescent dosimeter 1 and the identification card 4 are read optically. The punched holes 3 or 5 are placed so as to face to the matrix of sensors. By feeding a negative pulse successively to terminals $CL_1 \sim CL_3$, the photo sensors Rs are driven and the output pulse signals representing the coded numbers are obtained at the output terminals $R_1 \sim R_{10}$ of amplifiers A.

In the following, the detailed construction and operation of the comparator assembly 11 is described.

Figure 5:
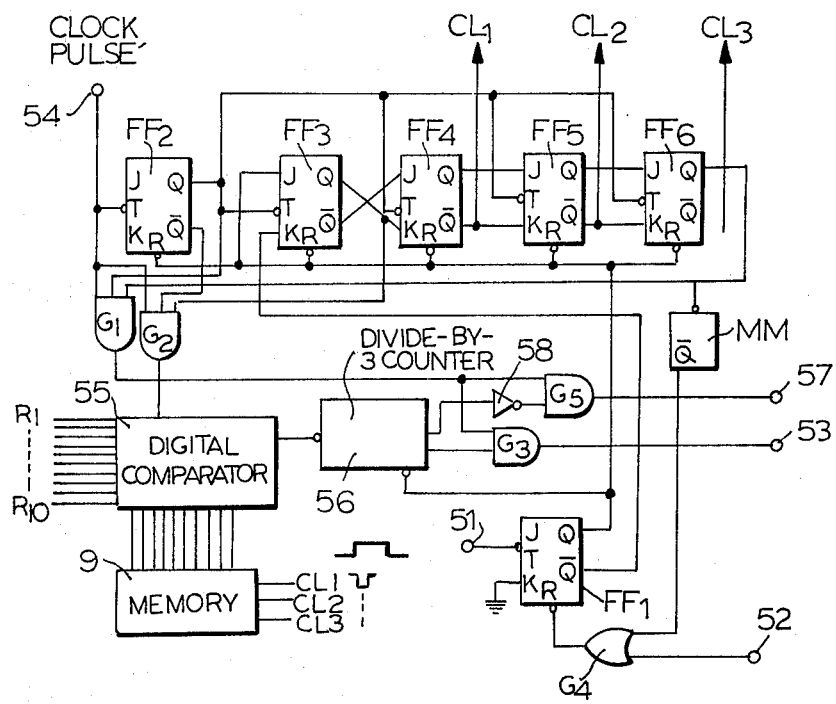
FIG. 5 is a circuit diagram of one embodiment of a comparator assembly in the apparatus of FIG. 3.

Referring to FIG. 5, a terminal 51 is connected to trigger terminal of a flip-flop circuit $FF_1$, one output of which is connected to the reset terminals R of flip-flop $FF_2$-$FF_6$. When the detection device 8 ends its action, an end signal is supplied to the terminal 51, and thereby the flip-flop circuit $FF_1$ is triggered, causing flip-flop circuits $FF_2 \sim FF_6$ to be set to the operational state. The flip-flop circuit $FF_2$ is supplied with clock pulses from a terminal 54, so that it repeats a flip-flop action. The flip-flop circuits $FF_3 \sim FF_6$ are connected to form a shift register and in response to the signal from the flip-flop circuit $FF_2$ a negative pulse is successively generated at the terminals $CL_1$-$CL_3$. The terminals $CL_1 \sim CL_3$ are connected to the corresponding terminals of the detection device 10 as shown in FIG. 4. They are also connected to the memory device 9 so as to call out the memorized code number from the dosimeter 1. $G_1$ and $G_2$ are AND gates. For example, when a negative pulse is supplied from the terminal $CL_1$, the code signals of the corresponding column on the identification card 4 are detected and transferred to a digital comparator 55 via terminals $R_1 \sim R_{10}$. Simultaneously the corresponding code signals in the memory device 9 are transferred to the digital comparator 55. As a result of collation by the digital comparator 55, when the code signals coincide with each other, an output pulse is generated and is applied to a divide-by-three counter 56. If the code signals from the memory device 9 and the detection device 4 completely coincide, three pulses are counted by the counter 56, and then the counter 56 generates a pulse. This pulse is applied to an AND gate $G_3$ and at the output terminal 53 of the AND gate $G_3$ a pulse is generated. On the other hand, when the code signals do not coincide, a pulse is generated at the output terminal 57 of an AND gate $G_5$, because the output of the counter 56 is applied to the AND gate $G_5$ through an inverter 58.

The terminal 53 is connected to the control unit 7 and the terminal 57 is connected to the indicator 17 and recording device 16.

$G_4$ is an OR gate and generates a pulse in response to an end signal supplied from flip-flop circuit $FF_6$ through a monostable multivibrator MM or in response to a signal related to switching-on of the apparatus. This pulse resets the flip-flop circuit $FF_1$.

Figure 6:
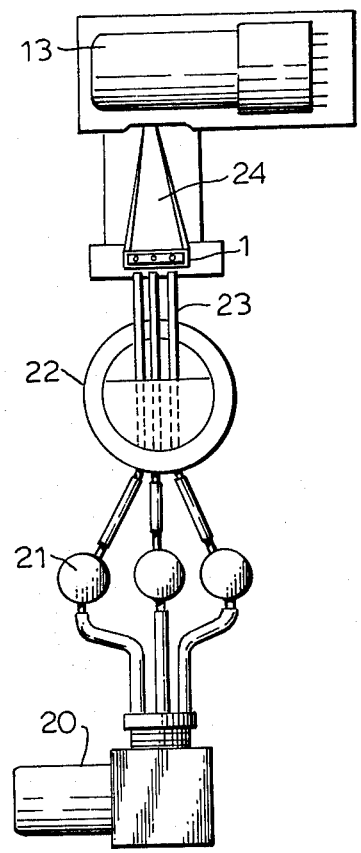
FIG. 6 is a plan view of heating and measuring assembly in the apparatus of FIG. 3.

Referring to FIG. 6, a detailed description relating to the heating and the detection of thermoluminant rays is given in the following. When the code signals coincide with each other, a positive pulse is generated at the output terminal 53 of the AND gate $G_3$. This positive pulse is fed to a drive circuit of the air pump 20 to start driving it. A stream of the air passes through an electromagnetic valve 21 and thermal converter 22, and thereby the air stream is converted to a hot air jet stream. The thermoluminescent dosimeter 1 is heated up by the hot air jet stream which is passed through three nozzles 23 against the respective dosimeter elements 1a of the dosimeter. As a result, thermoluminant rays are emitted from the dosimeter 1 and are guided to the photomultiplier tube 13 via a convergent photo guide 24. The dosimeter elements 1a can be heated up to the temperature described above by switching sequentially the electro-magnetic valves 21. The thermoluminant rays are converted to d.c. current signals by the photomultiplier tube 13.

By the use of the readout apparatus of the present invention, it is possible to control, as part of a radiation protection service or routine radiation dose monitoring, a door opening and closing mechanism which is provided at the entrance and exit of the radiation hazard area, i.e., the output pulse appearing in the terminal 53 or 57 is fed to a suitable delay circuit and after a delay time a command signal from the delay circuit is applied to a suitable door controller.

What is claimed is:

1. A thermoluminescent type radiation dosimeter readout apparatus comprising:
    means to hold a thermoluminescent type radiation dosimeter, means for heating the dosimeter held by said holding means, means for measuring the thermoluminant rays emitted from the heated dosimeter;
    a first detecting means associated with said dosimeter holding means for detecting indicia on the held dosimeter and producing a first signal corresponding thereto;
    a card holding means for receiving a personal identification card having indicia thereon and retaining it at a predetermined position;
    a second detecting means associated with said card holding means for detecting the indicia on the received personal identification card and producing a second signal corresponding thereto;

a collating means coupled to said first and second detecting means for collating the first detected signal and the second detected signal, and generating a starting signal when said signals are in a predetermined relation; and a control means connected with said collating means and for controlling the operation of the apparatus for carrying out a measurment only when said starting signal is supplied thereto.

2. A thermoluminescent type radiation dosimeter readout apparatus as claimed in claim 1 wherein said dosimeter has a frame for supporting a thermoluminescent dosimeter element and said indicia are formed on said frame, and said first detecting means comprises means for detecting the indicia on the dosimeter frame.

3. A thermoluminescent type radiation readout apparatus as claimed in claim 2 wherein said indicia are holes in said frame, and said means for detecting the indicia comprise hole detecting means.

4. A thermoluminescent type radiation readout apparatus as claimed in claim 1, further comprising an alarm means coupled to said collating means for being actuated when said indicia on said dosimeter and on said identification card are not in said predetermined relation.

5. A thermoluminescent type radiation readout apparatus as claimed in claim 1, wherein said control means is connected to said heating means for operating said heating means only when said starting signal is supplied to said heating means.

* * * * *